US005182584A

United States Patent [19]

Fukunaga et al.

[11] Patent Number: 5,182,584

[45] Date of Patent: Jan. 26, 1993

[54] MULTICOLOR DEVELOPING DEVICE WITH IMPROVED MOVABLE FRAME ARRANGEMENT

[75] Inventors: Yasuyuki Fukunaga, Hirakata; Hideki Kita, Suita; Akira Nakakuma, Takaishi; Toru Taniguchi, Hirakata; Hidehiro Fukui, Shisou; Yoshinobu Takemura, Kita Katsuragi, all of Japan

[73] Assignee: Mita Industrial Co., Ltd., Japan

[21] Appl. No.: 617,770

[22] Filed: Nov. 26, 1990

[30] Foreign Application Priority Data

Nov. 29, 1989 [JP] Japan .................................. 1-311245
May 22, 1990 [JP] Japan .................................. 2-130395

[51] Int. Cl.[5] .............................................. G01D 15/06

[52] U.S. Cl. .................................. 346/157; 346/160.1; 355/245; 355/206; 355/327

[58] Field of Search ...............: 346/57, 160.1; 355/326, 355/327, 245, 206

[56] References Cited

U.S. PATENT DOCUMENTS

| | | | |
|---|---|---|---|
| 4,449,812 | 5/1984 | Faruichi et al. | 355/206 |
| 4,477,178 | 10/1984 | Furuichi et al. | 355/206 |
| 4,678,979 | 7/1987 | Hori | 318/696 |
| 4,711,553 | 12/1987 | Watanabe | 355/4 |
| 4,713,699 | 12/1987 | Nakamura et al. | 358/296 |
| 4,722,916 | 9/1988 | Mochida | 355/327 |
| 4,894,684 | 1/1990 | Nakajima et al. | 355/326 X |
| 4,928,146 | 5/1990 | Yamada | 355/245 X |
| 4,939,548 | 7/1990 | Yamada et al. | 355/245 |
| 4,958,191 | 9/1990 | Yamada et al. | 355/326 X |
| 4,974,828 | 12/1990 | Matsuo et al. | 271/293 |
| 5,070,362 | 12/1991 | Noda | 355/206 |

FOREIGN PATENT DOCUMENTS

| | | |
|---|---|---|
| 266946 | 5/1988 | European Pat. Off. . |
| 294097 | 7/1988 | European Pat. Off. . |
| 420217 | 4/1991 | European Pat. Off. . |
| 239571 | 9/1989 | Japan . |

OTHER PUBLICATIONS

European Search Report.
Annex to Search Report.
Patent Abstracts Of Japan, vol. 14, No. 1 (P-985) [3944] Jan. 8, 1990.
Patent Abstracts of Japan, vol. 7, No. 57, (P-181) [1202], Mar. 9, 1983.
Xerox Disclosure Journal, vol. 11, No. 6 Nov./Dec. 1986, pp. 275-277 Stamford, Conn., US; T. F. Cooper: "A Sorting Apparatus".
Partial European Search Report; Annex to Search Report; Communications from the EOP concerning reasons that the European Search Report was made partial.

*Primary Examiner*—George H. Miller, Jr.
*Assistant Examiner*—Randy W. Gibson
*Attorney, Agent, or Firm*—Beveridge, DeGrandi, Weilacher and Young

[57] ABSTRACT

A multicolor developing device having a plurality of developing mechanisms for executing developing with differrent colors. The developing device includes a stationary frame member, a movable frame member mounted on the stationary frame member to reciprocally move in a predetermined direction, and a moving device for reciprocally moving the movable frame member. The plurality of developing mechanisms are mounted on the movable frame member and maintaining a distance in the said predetermined direction. Any one of the plurality of developing mechanisms is selectively positioned at a developing zone depending on the movement of the movable frame member. The moving device includes a screw device having a threaded shaft extending in the predetermined direction and a nut engaged with the threaded shaft, a stepping motor for rotating the threaded shaft, and a nonexcited operation-type electromagnetic brake. A pair of racks are disposed on the stationary frame member and maintain a distance in the lateral direction, and the movable frame member is provided with a rotary shaft extending in the lateral direction and a pair of pinions fitted to the rotary shaft, the pair of pinions being engaged with the pair of racks. Each of the developing mechanisms is provided with a pair of distance-setting rollers which are brought into resilient contact with a rotary drum in order to accomplish the positioning of the developing mechanism relative to the rotary drum.

38 Claims, 9 Drawing Sheets

MULTICOLOR DEVELOPING DEVICE WITH IMPROVED MOVABLE FRAME ARRANGEMENT

FIELD OF THE INVENTION

The present invention relates to a multicolor developing device used for developing electrostatic latent image in a color image forming machine such as a color copying machine or a color printing machine.

DESCRIPTION OF THE PRIOR ART

In recent years, color images have been demanded ever than before, and a color image forming machine of the electrostatic type has been proposed and has been put into practical use. In a typical color image forming machine, there is formed on an electrostatic photosensitive material disposed on a rotary drum an electrostatic latent image for each of a plurality of colors consisting of, for example, four colors such as yellow color (Yellow), red color (Magenta), blue color (Cyan) and black color (Black), and then the electrostatic latent image is developed by a developing device and is transferred onto an image-receiving material which may be a common paper, and thus the color image is formed on the image-receiving material.

In the above color image forming machine, the developing device must be a multicolor developing device that is capable of selectively developing the electrostatic latent image in four colors such as yellow color, red color, blue color and black color. Such multicolor developing device has been proposed and put into practice in a form which is comprised of a stationary frame member, a movable frame member which is mounted on the stationary frame member to move in a predetermined direction that is preferably the vertical direction, a plurality of developing mechanisms mounted on the movable frame member maintaining a distance in said predetermined direction, and moving means for moving the movable frame member in said predetermined direction, as disclosed in, for example, Japanese Patent Laid-Open Publication No. 239571/1989. In this multicolor developing device, the movable frame member is suitably moved by the moving means such that each of the plurality of developing mechanisms is selectively positioned at a developing zone for developing electrostatic latent image, and each of the plurality of developing mechanisms carries out developing action in different colors which may be, for example, yellow color, red color, blue color and black color in the developing zone. Each of the developing mechanisms usually includes a developing agent applying means which is preferably constituted by a cylindrical sleeve, the developing agent applying means holding a developing agent on the surface thereof to apply it to the electrostatic latent image.

However, the conventional multicolor developing devices have the following problems that must be solved.

First, in order to fully satisfactorily develop the electrostatic latent image using the developing mechanisms, it is essential that each of the developing mechanisms is positioned at the developing zone very accurately. In the conventional multicolor developing device, therefore, in addition to the moving means for moving the movable frame member in the predetermined direction, an accurately positioning mechanism is disposed to very accurately position each of the developing mechanisms mounted on the movable frame member at the required position. Due to the accurately positioning mechanism, however, the conventional multicolor developing devices are fabricated requiring considerably increased cost and, moreover, the movable frame member is moved requiring a considerably extended period of time.

Second, in the conventional multicolor developing device, the movable frame member is positioned at a required position very accurately owing to the accurately positioning mechanism and is further maintained at the required position by the action of the accurately positioning mechanism. However, the conventional multicolor developing device involves the following problems in relation to the movement of the movable frame member in addition to the above-mentioned problems related to the accurately positioning mechanisms. That is, the moving means for moving the movable frame member includes a rotary drive source which may be an electric motor, and the movable frame member is moved by the energization of the electric motor. However, in case the electric motor is accidentally deenergized due to, for example, power failure or the like while the movable frame member is being moved by the electric motor (i.e., the movable frame member is not located at any one of the plurality of required positions corresponding to the plurality of developing mechanisms but is moving somewhere among these required positions), then the movable frame member suddenly falls down due to its own weight to make considerable impact to such a degree that may often damage the developing mechanisms.

Third, in the conventional multicolor developing device, the moving means for moving the movable frame member includes the electric motor as described above, and the electric motor is energized and is rotated at a predetermined speed to move the movable frame member as required. However, when the movable frame member is started to move and when its movement is stopped and, particularly, when the movement of the movable frame member is stopped to position the movable frame member at a required position, impact is made to a considerable degree due to the sudden start or stop of the electric motor.

Fourth, in order to very favorably develop the electrostatic latent image on the electrostatic photosensitive material disposed on the rotary drum in the developing zone, it is important that the developing agent applying means (which usually comprises a cylindrical sleeve) of a particular developing mechanism is very accurately positioned at the required position with respect to the rotary drum when the movable frame member is positioned at the required position such that the particular developing mechanism is positioned at the developing zone among the plurality of developing mechanisms. The conventional multicolor developing device employs a relatively complex, expensive and bulky guide-and-positioning mechanism that includes a guide rail and a guide cam mechanism, in order that the movable frame member on which the plurality of developing mechanisms are mounted is allowed to move smoothly and that the developing agent applying means is positioned at the required position very accurately with respect to the rotary drum.

Fifth, it is desired that the movable frame member can be removed from the stationary frame member very easily and quickly as required, so that it is allowed to very easily and quickly check or repair the plurality of developing mechanisms that are mounted on the movable frame member and to very easily and quickly check or repair the rotary drum on which is disposed the electrostatic photosensitive member on which is formed electrostatic latent image that is to be developed as well as the constitutional elements disposed in the vicinity of the rotary drum. However, the conventional multicolor developing device does not satisfy such requirements.

Sixth, in order for very accurately positioning a particular developing mechanism among the plurality of developing mechanisms at the required position as a result of positioning the movable frame member at the required position, it is important that the movable frame member is very accurately positioned in the moving direction thereof and further is very accurately mounted in the lateral direction relative to the moving direction thereof with respect to the stationary frame member and that it is maintained under such a condition even when it is in motion. Otherwise, the developing agent applying means of the developing mechanism fails to laterally extend very accurately, and there arises a problem in that the developing action is deteriorated. In the conventional multicolor developing device, however, though it was not impossible, it was very difficult to very accurately position the movable frame member in the lateral direction relative to the moving direction thereof with respect to the stationary frame member and to reliably maintain it under such a condition.

Seventh, in the conventional multicolor developing device, it was necessary to bring the driving direction of the moving means that moves the movable frame member into very accurate agreement with the moving direction of the movable frame member mounted on the stationary frame member in addition to very accurately mounting the movable frame member on the stationary frame member. Otherwise, undesired force acts between the moving means and the movable frame member when the movable frame member is being moved, and it becomes difficult to execute the desired multicolor developing or the developed image is seriously deteriorated within short periods of time. In practice, however, it is considerably difficult to bring the driving direction into very accurate agreement with the moving direction, and very sophisticated skill and elongated time are required for assembling the device. This resulted in increase in the manufacturing cost.

SUMMARY OF THE INVENTION

A first object of the present invention is to provide an improved multicolor developing device which enables the movable frame member to be very accurately positioned at the required position without requiring any particular accurately positioning mechanism, which, therefore, enables the manufacturing cost to be lowered compared with the conventional multicolor developing devices, and which is capable of quickly moving and positioning the movable frame member.

A second object of the present invention is to provide an improved multicolor developing device which is capable of reliably maintaining the movable frame member at the required position, and which reliably inhibits the motion of the movable frame member and reliably prevents the movable frame member from suddenly falling down due to its own weight even when the electric motor is accidentally deenergized due to power failure or the like during the time when the movable frame member is being moved by the energization of the electric motor in the moving means that moves the movable frame member.

A third object of the present invention is to provide an improved multicolor developing device in which the electric motor in the moving means for moving the movable frame member gradually increases its speed when it started rotating and gradually decreases its speed when it is to be stopped without requiring any complex or expensive means, making it possible to avoid the generation of a considerable impact upon the movable frame member when it starts moving or is stopped.

A fourth object of the present invention is to provide an improved multicolor developing device in which the developing agent applying means in each of the plurality of developing mechanisms is very accurately positioned at the required position with respect to the rotary drum on which surface there is disposed the electrostatic photosensitive material to develop the electrostatic latent image formed on the electrostatic photosensitive material, without requiring any guide-and-positioning mechanism which is relatively complex, expensive and bulky, contributing to decreasing the manufacturing cost and decreasing the size.

A fifth object of the present invention is to provide an improved multicolor developing device which permits the movable frame member to be very easily and quickly removed from the stationary frame member at the time of checking or repairing the plurality of developing mechanisms mounted on the movable frame member or at the time of checking or repairing the rotary drum on which the electrostatic photosensitive material is disposed and the constitutional elements disposed in the vicinity of the rotary drum.

A sixth object of the present invention is to provide an improved multicolor developing device which is capable of easily, quickly and very accurately positioning the movable frame in the lateral direction relative to the moving direction thereof with respect to the stationary frame member, and reliably maintaining it under such a condition.

A seventh object of the present invention is to provide an improved multicolor developing device which does not make such a trouble that undesired force is produced between the moving means and the movable frame member despite there is some deviation between the driving direction of the moving means that moves the movable frame member and the moving direction of the movable frame member.

The gist of the present invention for achieving the above first object resides in that a screw means having a threaded shaft that extends in a predetermined direction and a nut engaged with the threaded shaft is used in the moving means for moving the movable frame member, and a rotary drive source for rotating the threaded shaft in the screw means is constituted by a stepping motor.

In order to achieve the above first object according to the present invention, there is provided a multicolor developing device comprising a stationary frame member, a movable frame member mounted on said stationary frame member to reciprocally move in a predetermined direction, a plurality of developing mechanisms mounted on said movable frame member maintaining a distance in said predetermined direction, and a moving means for reciprocally moving said movable frame member in said predetermined direction, each of said plurality of developing mechanisms being selectively positioned at a developing zone by the movement of said movable frame member caused by said moving means and executing developing action of colors different from each other at said developing zone, wherein said moving means comprises a screw means that has a threaded shaft extending in said predetermined direction and a nut engaged with said threaded shaft, and a rotary drive source consisting of a stepping motor for rotating said threaded shaft of said screw means.

The gist of the present invention for achieving the above second object resides in that a rotary drive source consisting of an electric motor and a nonexcited operation-type electromagnetic brake which produces the braking action when it is not energized and does not produce the braking action when it is energized, are used in the moving means for moving the movable frame member.

In order to achieve the above second object according to the present invention, there is provided a multicolor developing device comprising a stationary frame member, a movable frame member mounted on said stationary frame member to reciprocally move in a predetermined direction, a plurality of developing mechanisms mounted on said movable frame member maintaining a distance in said predetermined direction, and a moving means for reciprocally moving said movable frame member in said predetermined direction, each of said plurality of developing mechanisms being selectively positioned at a developing zone by the movement of said movable frame member caused by said moving means and executing developing action of a color different from each other at said developing zone, wherein said moving means comprises a rotary drive source consisting of an electric motor and a nonexcited operation-type electromagnetic brake that produces the braking action when it is not energized and does not produce the braking action when it is energized.

The gist of the present invention for achieving the above third object resides in that a stepping motor is used as a rotary drive source in the moving means for moving the movable frame member, and the interval for pulses fed to the rotary drive source is gradually shortened to gradually increase the output speed of revolution of the rotary drive source at the time when the rotary drive source is started to rotate, while the interval for pulses fed to the rotary drive source is gradually prolonged to gradually decrease the output speed of revolution of the rotary drive source at the time when the operation of the rotary drive source is to be stopped.

In order to achieve the above third object according to the present invention, there is provided a multicolor developing device comprising a stationary frame member, a movable frame member mounted on said stationary frame member to reciprocally move in a predetermined direction, a plurality of developing mechanisms mounted on said movable frame member maintaining a distance in said predetermined direction, and a moving means for reciprocally moving said movable frame member in said predetermined direction, each of said plurality of developing mechanisms being selectively positioned at a developing zone by the movement of said movable frame member caused by said moving means and executing developing action of a color different from each other at said developing zone, wherein moving means includes a rotary drive source consisting of a stepping motor and a control means that controls the pulses fed to said rotary drive source, and when said movable frame member is being moved to a required position by the action of said rotary drive source, said control means gradually shortens the interval for pulses fed to said rotary drive source in order to gradually increase the output speed of revolution of said rotary drive source when said movable frame member starts moving and gradually prolongs the interval for pulses fed to said rotary drive source in order to gradually decrease the output speed of revolution of said rotary drive source when the motion of the movable frame member is to be stopped.

The gist of the present invention for achieving the above fourth object resides in that in the developing mechanisms, there are disposed a developing housing, equipped with developing agent applying means mounted on the movable frame member to move over a predetermined range in a direction to approach, or separate away from, the rotary drum, a resiliently urging means which resiliently urges said developing housing toward a direction to approach the rotary drum, as well as a pair of distance-setting rollers positioned on both sides of the developing agent applying means, and when each of the developing mechanisms is to be positioned at the developing zone, the pair of distance-setting rollers come in contact with the surface of the rotary drum such that the developing housing moves in a direction to separate away from the rotary drum against the resiliently urging action of the resiliently urging means, enabling each of the developing mechanisms to be positioned at predetermined position relative to the surface of the rotary drum.

In order to achieve the above fourth object according to the present invention, there is provided a multicolor developing device comprising a stationary frame member, a movable frame member mounted on said stationary frame member to reciprocally move in a predetermined direction, a plurality of developing mechanisms mounted on said movable frame member maintaining a distance in said predetermined direction, and a moving means for reciprocally moving said movable frame member in said predetermined direction, each of said plurality of developing mechanisms being selectively positioned at a developing zone by the movement of said movable frame member caused by said moving means and executing developing action of a color different from each other at said developing zone, wherein each of said developing mechanisms comprises a developing housing mounted on said movable frame member to move over a predetermined range in a direction to approach, or separate away from, the rotary drum, a resiliently urging means which resiliently urges said developing housing in a direction to approach said rotary drum, a developing agent applying means that is equipped on said developing housing to hold a developing agent on the surface thereof, and a pair of distance-setting rollers that are rotatably disposed on both sides of said developing agent applying means, and when each of said developing mechanisms is positioned at the developing zone, said pair of distance-setting rollers are brought into contact with the surface of the rotary drum such that said developing housing moves in a direction to separate away from said rotary drum against the resiliently urging action of said resiliently urging means, enabling each of the developing mechanisms to be positioned at the predetermined position relative to the surface of said rotary drum.

The gist of the present invention for achieving the above fifth object resides in that, a coupling bracket is detachably mounted on the movable frame member, and in a screw means constituting the moving means that moves the movable frame member a threaded shaft is fitted to the stationary frame member and a nut is coupled to said coupling bracket, and when the coupling bracket is removed from the movable frame member by moving the movable frame member in a predetermined direction, the movable frame member is allowed to be removed from the stationary frame member.

In order to achieve the above fifth object according to the present invention, there is provided a multicolor developing device comprising a stationary frame member, a movable frame member mounted on said stationary frame member to reciprocally move in a predetermined direction, a plurality of developing mechanisms mounted on said movable frame member maintaining a distance in said predetermined direction, and a moving means for reciprocally moving said movable frame member in said predetermined direction, each of said plurality of developing mechanisms being selectively positioned at a developing zone by the movement of said movable frame member caused by said moving means and executing developing action of a color different from each other at said developing zone, wherein a coupling bracket is detachably mounted on said movable frame member, said moving means includes a screw means that has a threaded shaft rotatably fitted to said stationary frame member and a nut that is coupled to said coupling bracket and is engaged with said threaded shaft, and when said coupling bracket is removed from said movable frame member by moving said movable frame member in said predetermined direction, said movable frame member is allowed to be removed from said stationary frame member.

The gist of the present invention for achieving the above sixth object resides in that, a screw means having a threaded shaft extending in a predetermined direction and a nut that engages with the threaded shaft is used in the moving means for moving the movable frame member, and further a pair of racks extending in a predetermined direction are disposed on either the stationary frame member or the movable frame member maintaining a distance in the lateral direction, a rotary shaft extending in the lateral direction is rotatably mounted on the other one of the stationary frame member or the movable frame member and a pair of pinions are fitted to the rotary shaft maintaining a distance in the lateral direction, and at least either one of said pair of pinions engaged with said pair of racks is rotatably fitted to said rotary shaft and is releasably fastened thereto by a fastening means to inhibit the rotation thereof.

In order to achieve the above sixth object according to the present invention, there is provided a multicolor developing device comprising a stationary frame member, a movable frame member mounted on said stationary frame member to reciprocally move in a predetermined direction, a plurality of developing mechanisms mounted on said movable frame member maintaining a distance in said predetermined direction, and a moving means for reciprocally moving said movable frame member in said predetermined direction, each of said plurality of developing mechanisms being selectively positioned at a developing zone by the movement of said movable frame member caused by said moving means and executing developing action of a color different from each other at said developing zone, wherein a pair of racks extending in the predetermined direction are disposed on either one of said stationary frame member or said movable frame member maintaining a distance in the lateral direction, a rotary shaft extending in said lateral direction is rotatably mounted on the other one of said stationary frame member or said movable frame member, a pair of pinions are fitted to said rotary shaft maintaining a distance in said lateral direction, and said pair of pinions are engaged with said pair of racks.

The gist of the present invention for achieving the above seventh object resides in that, a screw means having a threaded shaft extending in a predetermined direction and a nut engaging with the threaded shaft is used in the moving means for moving the movable frame member, the threaded shaft is fitted to either the stationary frame member or the movable frame member, the nut is fitted to the other one of the stationary frame member or the movable frame member via a coupling bracket, and said coupling bracket and said nut are coupled together to tilt relative to each other in any direction.

In order to achieve the above seventh object according to the present invention, there is provided a multicolor developing device comprising a stationary frame member, a movable frame member mounted on said stationary frame member to reciprocally move in a predetermined direction, a plurality of developing mechanisms mounted on said movable frame member maintaining a distance in said predetermined direction, and a moving means for reciprocally moving said movable frame member in said predetermined direction, each of said plurality of developing mechanisms being selectively positioned at the developing zone by the movement of said movable frame member caused by said moving means and executing developing action of a color different from each other at said developing zone, wherein said moving means includes a screw means that has a threaded shaft extending in said predetermined direction and a nut engaged with said threaded shaft, said threaded shaft of said screw means is rotatably fitted to either one of said stationary frame member or said movable frame member, said nut of said screw means is fitted to the other one of said stationary frame member or said movable frame member via a coupling bracket, and said coupling bracket and said nut are coupled together to tilt relative to each other in any direction.

DETAILED DESCRIPTION OF THE PREFERRED EMBODIMENTS

Figure 1:
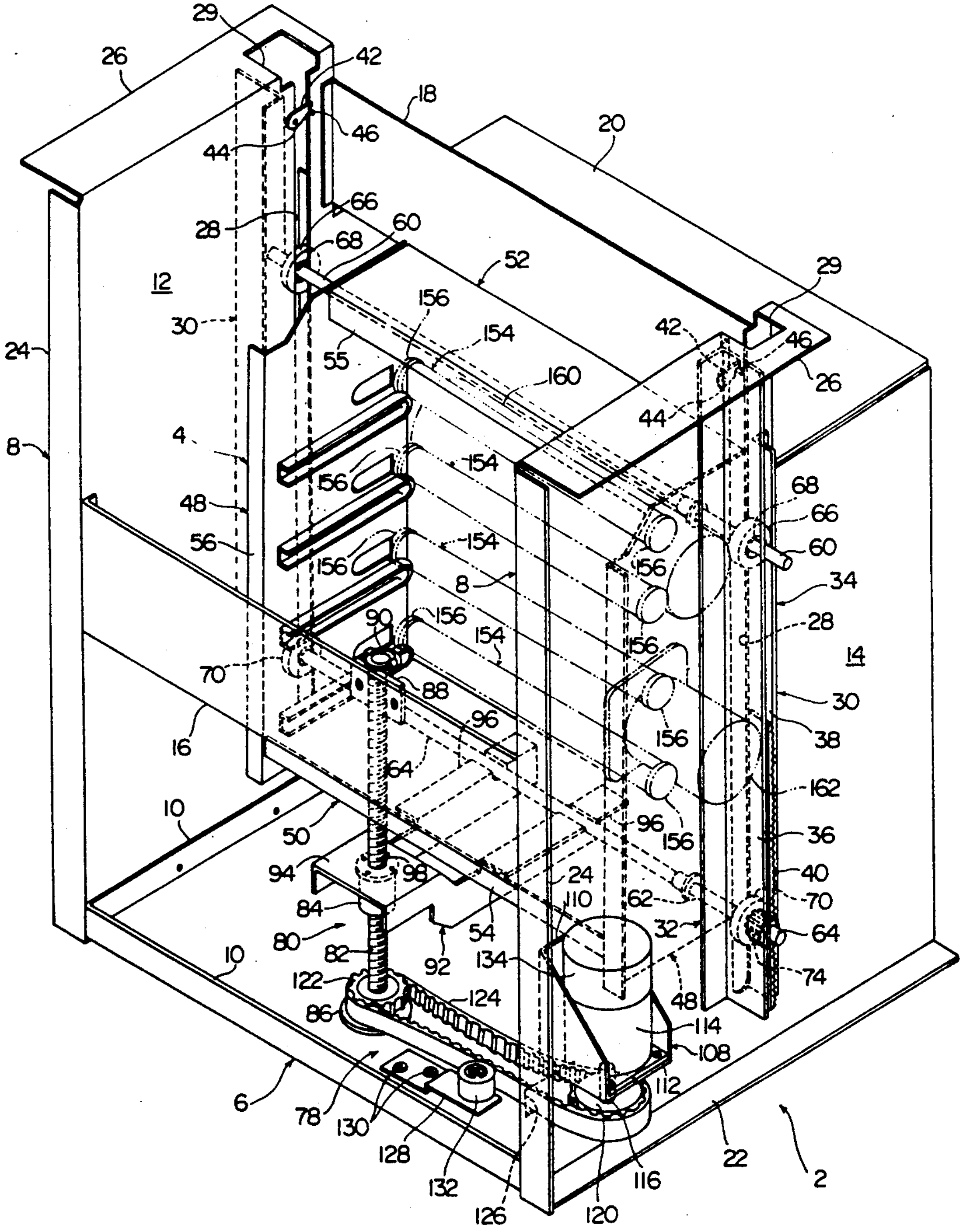
FIG. 1 is a perspective view showing a stationary frame member, a movable frame member and a moving means in a concrete embodiment of a multicolor developing device constituted according to the present invention.

Preferred embodiments of the multicolor developing device constituted according to the present invention will now be described in detail with reference to the accompanying drawings.

If described with reference to FIG. 1, the diagramed multicolor developing device constituted according to the present invention comprises a stationary frame member generally designated at 2 and a movable frame member generally designated at 4 which is mounted on the stationary frame member 2 to reciprocally move (ascend and descend) in the vertical direction.

If described with reference to both FIGS. 1 and 2, the diagramed stationary frame member 2 includes a bottom plate 6 that is disposed substantially horizontally, and a pair of side plates 8 that upwardly extend substantially vertically from both side edges of the bottom plate 6. Upright wall portions 10 are formed as a unitary structure at four side edges (i.e., both side edges and front and rear edges) of the bottom plate 6, and lower end portions of the side plates 8 are secured to the upright wall portions 10 at both side edges of the bottom plate 6 by a suitable securing means such as screws (not shown). Each of the side plates 8 has a main portion 12 and a forwardly protruded portion 14. The main portion 12 has nearly a rectangular shape slenderly extending in the vertical direction, and the forwardly protruded portion 14 protruded forward from the main portion 12 has also nearly a rectangular shape, but is slightly lower than the main portion 12. A reinforcing plate 16 extending in a lateral direction is secured to the rear ends of the two side plates 8 in a middle portion in the up-and-down direction by a suitable securing means such as screws (now shown). Another reinforcing plate 18 extending in the lateral direction is secured by a suitable securing means such as screws (not shown) to the front ends of the main portions 12 of the two side plates 8 at portions upwardly protruding beyond the forwardly protruded portions 14. A top plate 20 that extends in the lateral direction is secured to the upper ends of the forwardly protruded portions 14 of the two side plates 8 by a suitable securing means (not shown) such as screws. Extended wall portions 22, 24 and 26 that are outwardly protruded in the lateral direction are formed as a unitary structure at the lower edges and rear edges of the side plates 8 and at the upper edges of the main portions 12. Openings 28 narrowly extending in the vertical direction are formed in the main portions 12 of the side plates 8. The openings 28 extend to the upper end of the main portions 12 of the side plates 8, and openings 29 are formed in the extended wall portions 26 to correspond to the openings 28. A width in the back-and-forth direction of the openings 29 is greater than the width of the openings 28 in the back-and-forth direction. A rail means 30 is disposed on the outer surface of the side plates 8 to be associated with the openings 28 formed in the side plates 8. The rail means 30 is constituted by a pair of rail members 32 and 34 fixed to the outer surface of the side plates 8 maintaining a predetermined distance in the back-and-forth direction. The two rail members 32 and 34 that are secured to the outer surfaces of the side plates 8 by a suitable means such as screws (not shown) are constituted by members having an L-shape in cross section, and are disposed being opposed to each other with the opening 28 interposed therebetween. The rail members 32 and 34, respectively, have guide rail portions 36 and 38 that extend outwardly in the lateral direction and that further extend in the vertical direction maintaining a predetermined distance in the back-and-forth direction. A rack 40 that extends in the vertical direction is secured to the lower half portion of the guide rail portion 36. The rack 40 is disposed on the outside region in the lateral direction of the lower half portion of the guide rail portion 36, and the inside region in the lateral direction of the lower half portion of guide rail portion 36 is exposed so as to function as a guide rail. Engaging members 42 are disposed on the inner surfaces of the side plates 8 to be associated with the upper end portions of the openings 28. The engaging members 42 are rotatably mounted on the inner surfaces of the side plates 8 via a coupling pin 44. An engaging pin 46 is studded on the side opposite to the coupling pin 44 with the opening 28 interposed therebetween. When the engaging member 42 is turned up to a particular angular position as viewed from the right lower side in FIG. 2, the tip of the engaging member 42 engages with the engaging pin 46 and the engaging member 42 is maintained at the engaged position as shown. At the engaged position, the engaging member 42 traverses the opening 28 in the back-and-forth direction (to block a predetermined portion of the movable frame member 4 from downwardly moving in the opening 28 as will be described later in detail). When turned in the counterclockwise direction as viewed from the right lower side in FIG. 2, the engaging member 42 is located at the non-engaged position moved away back from the opening 28 (permitting the predetermined portion of the movable frame member 4 to downwardly move in the opening 28 as will be described later in detail).

Figure 2:
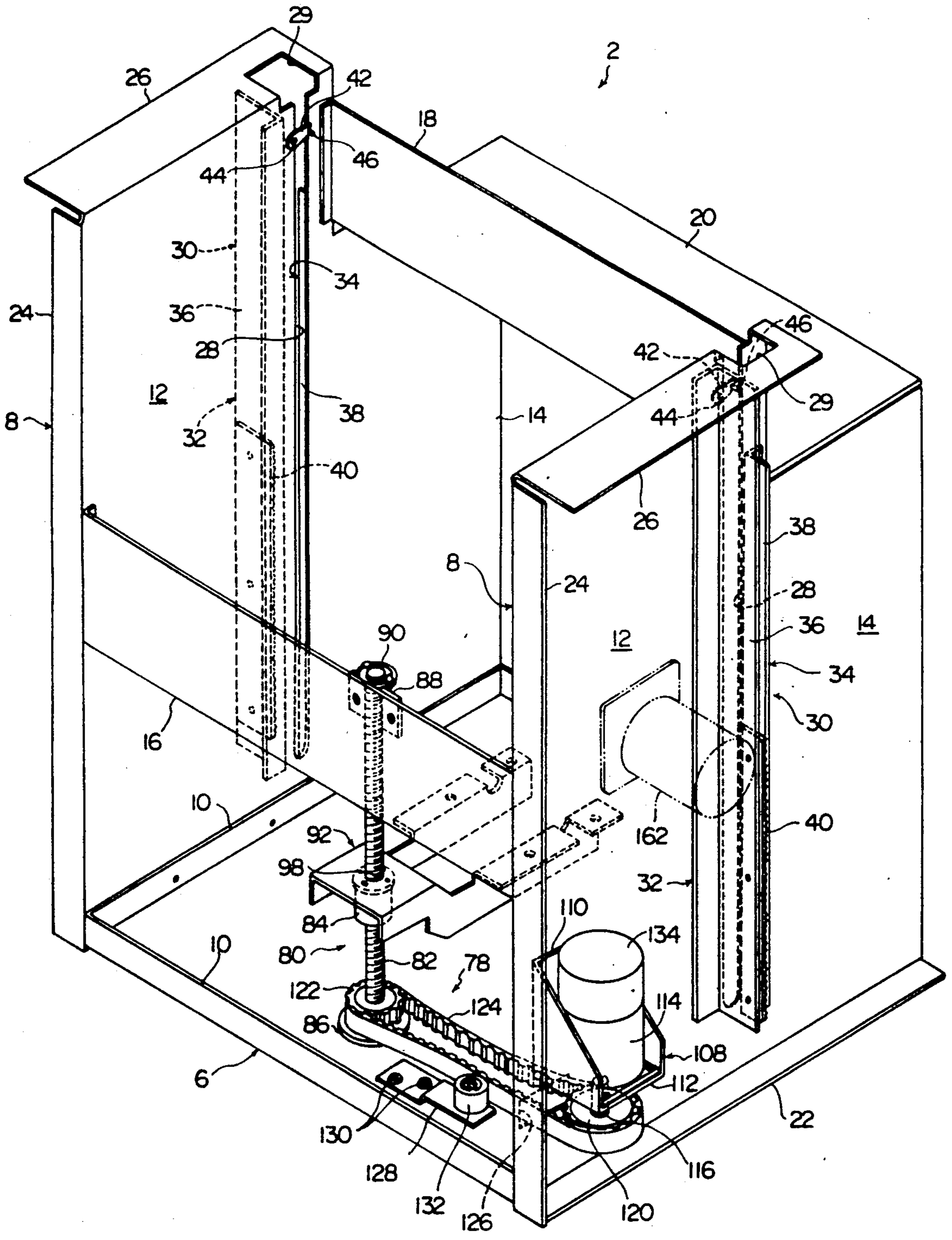
FIG. 2 is a perspective view showing the stationary frame member and the moving means in the multicolor developing device of FIG. 1.
Figure 3:
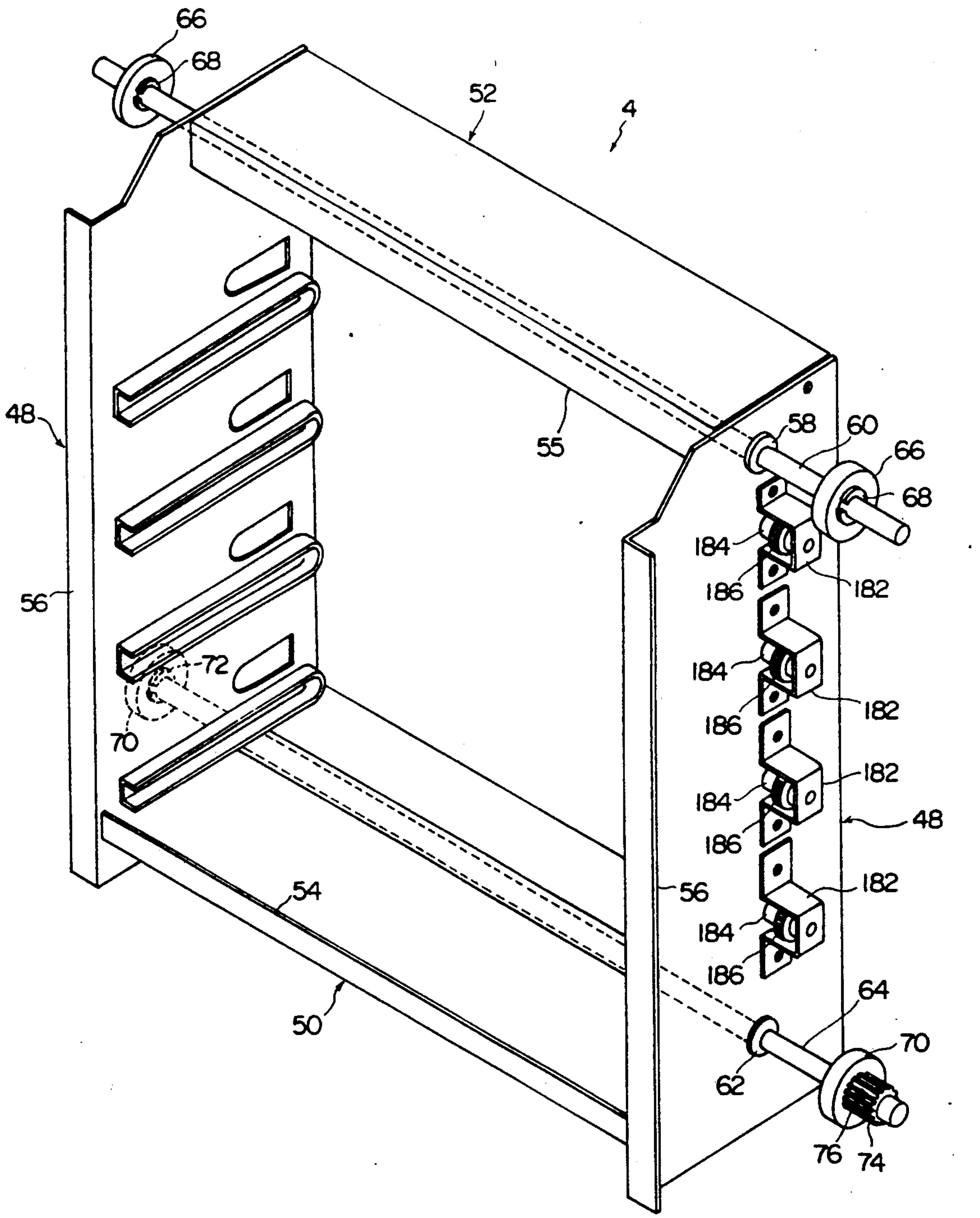
FIG. 3 is a perspective view showing the movable frame member in the multicolor developing device of FIG. 1.
Figure 4:
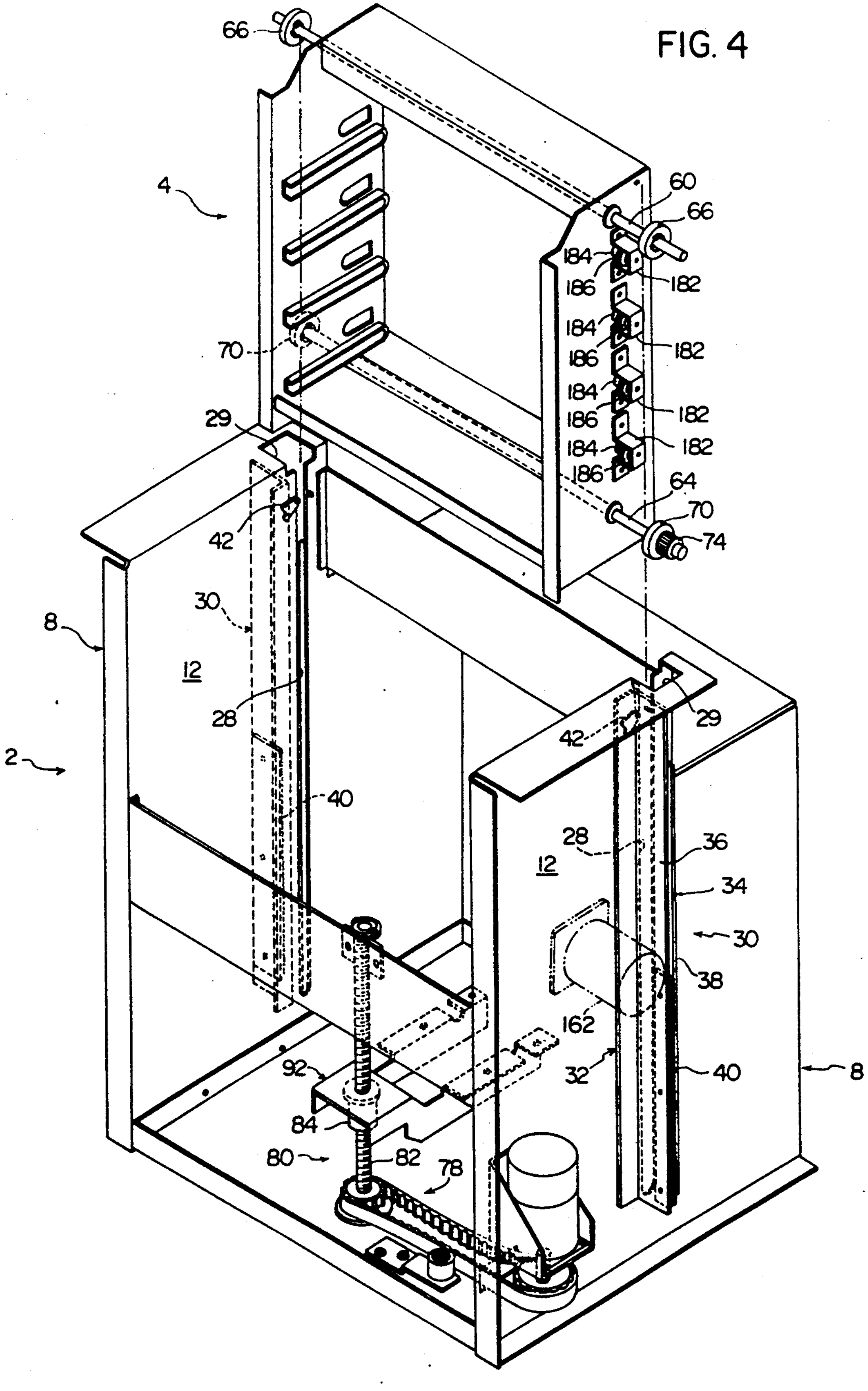
FIGS. 4 and 5 are perspective views useful in explaining the manner of mounting the movable frame member on the stationary frame member in the multicolor developing device of FIG. 1.
Figure 5:
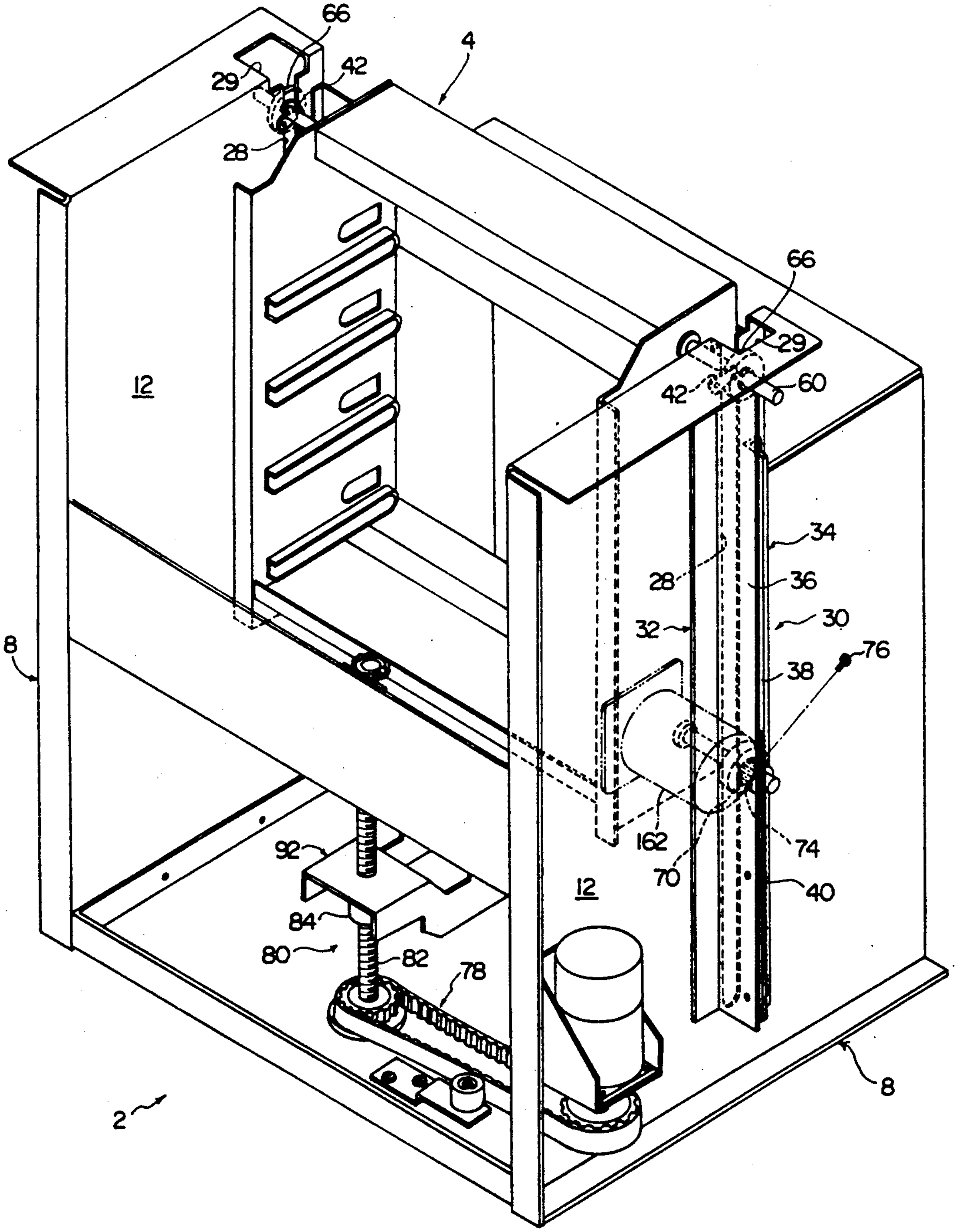

If the description is continued with reference to FIGS. 1 and 3, the diagramed movable frame member 4 includes a pair of side plates 48, a bottom plate 50 and a top plate 52. The pair of side plates 48 extend substantially vertically maintaining a predetermined distance in the lateral direction. The lower end portions of the side plates 48 are secured to both side edges of the bottom plate 50 by a suitable securing means such as screws (not shown), and the upper end portions of the side plates 48 are secured to both side edges of the top plate 52 by a suitable securing means such as screws (not shown). An upright wall portion 54 extending upwardly is formed as a unitary structure at the rear edge of the bottom plate 50 that extends substantially horizontally. Similarly, a hanging wall portion 55 extending downwardly is formed as a unitary structure at the rear edge of the top plate 52 that extends substantially horizontally. Furthermore, extended wall portions 56 outwardly protruding in the lateral direction are formed at the rear edges of the side plates 48 as a unitary structure. An upper rotary shaft 60 is rotatably mounted on the upper end portions of the pair of side plates 48 via bearing members 58, and a lower rotary shaft 64 is rotatably mounted on the lower end portions thereof via bearing members 62. The upper rotary shaft 60 extends substantially horizontally and its both end portions extend outwardly in the lateral direction beyond the side plates 48. The lower rotary shaft 64, too, extends substantially horizontally and its both end portions extend outwardly in the lateral direction beyond the side plates 48. The upper rotary shaft 60 and the lower rotary shaft 64 extend in parallel with each other and being in match with each other in the vertical direction. In other words, the center axis of the upper rotary shaft 60 and the center axis of the lower rotary shaft 64 extend substantially horizontally on the same plane that vertically extends. Rollers 66 are rotatably fitted to both end portions of the upper rotary shaft 60 that extend beyond the side plates 48. The rollers 66 are prevented from moving in the lateral direction by stop rings 68 that are fitted to the upper rotary shaft 60 on both sides of the rollers 66. Rollers 70 are rotatably fitted to both end portions of the lower rotary shaft 64 that extend outwardly in the lateral direction beyond the side plates 48. The rollers 70 are prevented from moving in the lateral direction by stop rings 72 that are fitted to the lower rotary shaft 64 on both sides of the rollers 70. Thus, two pairs of rollers 66 and 70 are rotatably provided for the movable frame member 4 maintaining a predetermined distance in the lateral direction and further maintaining a distance in the vertical direction. The rollers 66 and 77 have an outer diameter that meets the distance in the back-and-forth direction between the rail members 32, 34 and the guide rail portions 36, 38 which constitute the rail means 30 in the stationary frame member 2. Furthermore, pinions 74 are fitted to both side portions of the lower rotary shaft 64 on the outside of the rollers 70 in the lateral direction. Preferably, at least one of the pair of pinions 74 is rotatably fitted to the lower rotary shaft 64 and is releasably fixed by a suitable fastening means to the lower rotary shaft 64 so as not to rotate relatively thereto. In the diagramed embodiment, the pinion 74 (not shown) of the left side as viewed from behind (left lower side in FIG. 3) is fitted to the lower rotary shaft 64 so as not to rotate relatively thereto by so forming the left end portion of the lower rotary shaft 64 and the inner peripheral surface of the pinion 74 as to have a D-shape in cross section. On the other hand, the pinion 74 of the right side as viewed from behind (left lower side in FIG. 3) is rotatably fitted to the lower rotary shaft 64 and is fixed to the lower rotary shaft 64 so as not to rotate relatively thereto by a fastening means which may be a set-screw 76 that is screwed into the lower rotary shaft 64 penetrating through the pinion 74 in the radial direction. When the set-screw 76 is removed, the pinion 74 is no more fastened to the lower rotary shaft 64.

If the description is continued with reference to FIGS. 1 to 3, 4 and 5, the movable frame member 4 is positioned over the stationary frame member 2 to mount the movable frame member 4 on the stationary movable member 2. The engaging members 42 disposed to be associated with the upper end portions of openings 28 formed in the main portions 12 of both side plates 8 of the stationary frame member 2, are moved back to the non-engaging position shown in FIG. 4. The lower rotary shaft 64 as well as the rollers 70 and pinions 74 fitted to both end portions of the lower rotary shaft 64 in the movable frame member 4 are introduced into between the guide rail portions 36 and 38 of the rail members 32 and 34 in the rail means 30 disposed on both sides of the stationary frame member 2 passing through the openings 29 at the upper ends on both sides of the stationary frame member 2, and then the movable frame member 4 is lowered. The lower rotary shaft 64 itself of the movable frame member 4 is lowered through the openings 28 formed in the main portions 12 of both side plates 8 of the stationary frame member 2. After the movable frame member 4 is lowered to some extent and after the lower rotary shaft 64 of the movable frame member 4 has passed the engaging members 42 of the stationary frame member 2, the engaging members 42 of the stationary frame member 2 are turned to the engaging position shown in FIGS. 1, 2 and 5. As the movable frame member 4 is further lowered, both end portions of the upper rotary shaft 60 of the movable frame member 4 come in contact with the upper surfaces of the engaging members 42 located at the engaging position (in the diagramed embodiment, therefore, the both end portions of the upper rotary shaft 60 constitute engaged portions that act in cooperation with the engaging members 42). As the movable frame member 4 is lowered as described above, the rollers 66 fitted to both end portions of the upper rotary shaft 60 are introduced into between the guide rail portions 36 and 38 of the rail members 32 and 34 in the rail means 30 passing through the openings 29. The pair of engaging members 42 fitted to both sides of the stationary frame member 2 are at positions in match with each other very accurately in the horizontal direction. Therefore, when the upper rotary shaft 60 of the movable frame member 4 comes in contact with the upper surfaces of the pair of engaging members 42, the movable frame member 4 is positioned in the horizontal direction very accurately relative to the stationary frame member 2 (i.e., positioned in the lateral direction with respect to the vertical direction in which the movable frame member 4 moves relative to the stationary frame member 2). As will be understood with reference to FIG. 5, when the movable frame member 4 is lowered until the upper rotary shaft 60 comes in contact with the upper surfaces of the engaging member 42, the pinions 74 fitted to both end portions of the lower rotary shaft 64 come into engagement with the racks 40 secured to the lower half portions of the guide rail portions 36 and 38. Here, one of the two pinions 74 fitted to the lower rotary shaft 64 is not allowed to rotate relative to the lower rotary shaft 64, but the other pinion 74 (pinion 74 of the right side as viewed from the left lower side in FIG. 5) is not, at this moment, secured to the lower rotary shaft 64 by the set-screw 76 and is allowed to rotate relative to the lower rotary shaft 64. Therefore, unless the upper rotary shaft 60 comes in contact with the upper surfaces of the engaging members 42, the other pinion 74 is allowed to rotate relative to the lower rotary shaft 64 irrespective of the downward motion of the movable frame member 4, and it is allowed to correct the inclination in the lateral direction even when the movable frame member 4 is lowered being slightly tilted in the lateral direction. As the upper rotary shaft 60 comes in contact with the upper surfaces of the engaging members 42, the movable frame member 4 is positioned very accurately with respect to the stationary frame member 2 in the lateral direction. If the other pinion 74 is not allowed to rotate relative to the lower rotary shaft 64 from the first time, then the movable frame member 4 is prevented from tilting in the lateral direction relative to the stationary frame member 2 after the two pinions 74 have engaged with the racks 40, and it is not possible to correct the inclination of the movable frame member 4. After both end portions of the upper rotary shaft 60 have come in contact with the upper surfaces of the engaging members 42 and the inclination of the movable frame member 4 is corrected in the lateral direction, the other pinion 74 is secured to the lower rotary shaft 64 by the set-screw 76. Thus, after the pair of pinions 74 have engaged with the pair of racks 40, the movable frame member 4 is reliably prevented from inclining and is stably maintained under a required horizontal condition. Thereafter, the movable frame member 4 is slightly raised to lift up the upper rotary shaft 60 over the engaging members 42. The engaging members 42 are then moved back to the non-engaging positions shown in FIG. 4, and the movable frame member 4 is allowed to move in the vertical direction, i.e., allowed to ascend or descend with respect to the stationary member 2 (in practice, a movable frame member-moving means that will be described later is disposed as required between the stationary frame member 2 and the movable frame member 4). The movable frame member 4 is allowed to ascend or descend very accurately without tilting in any direction since two pairs of rollers 66 and 70 fitted to both end portions of the upper rotary shaft 60 and both end portions of the lower rotary shaft 64 are guided by the guide rail portions 36 and 38 of the rail members 32 and 34 in the rail means 30, and the pair of pinions 74 fitted to both end portions of the lower rotary shaft 64 are engaged with the racks 40 fixed to the guide rail portions 36 and 38.

In the diagramed embodiment, the stationary frame member 2 is provided with the guide rail means 30, and the movable frame member 4 is provided with the rollers 66 and 70 that function as means to be guided. As required, however, the movable frame member 4 may be provided with the guide rail means 30 and the stationary frame member 2 may be provided with the rollers 66 and 70. Similarly, the movable frame member 4 may be provided with the racks 40 and the stationary frame member 2 may be provided with the pinions 74 instead of providing the stationary frame member 2 with the racks 40 and providing the movable frame member 4 with the pinions 74. As required, furthermore, the movable frame member 4 may be equipped with suitable engaging members that are selectively positioned at the engaging positions and the non-engaging positions, and may constitute the engaged portions that act in cooperation with the engaging members of the stationary frame member 2.

If further described with reference to FIGS. 1 and 2, a moving means generally designated at 78 is disposed between the stationary frame member 2 and the movable frame member 4. The moving means 78 includes a screw means 80 consisting of a threaded shaft 82 and a nut 84 engaged with the threaded shaft 82. The threaded shaft 82 is rotatably mounted on the stationary frame member 2 and extends substantially vertically. If described in further detail, the lower end portion of the threaded shaft 82 is rotatably mounted on the bottom plate 6 of the stationary frame member 2 via a suitable bearing 86. Further, a bearing 90 is mounted by a bracket 88 on the front surface of the reinforcing plate 16 of the stationary frame member 2, and the upper end portion of the threaded shaft 82 is rotatably fitted to the bearing 90. On the other hand, the nut 84 is coupled to the movable frame member 4 via a coupling bracket 92. The screw means 80 constituted by the threaded shaft 82 and the nut 84 engaging therewith should preferably be a ball thread means which is known per se and in which a plurality of balls (not shown) are arranged between the threaded shaft 82 and the nut 84. The ball thread means that is desirably used can be made up of a ball thread that is manufactured by Nippon Seiko Co. and that is placed in the market for precision use or for general industrial use.

Figure 7:
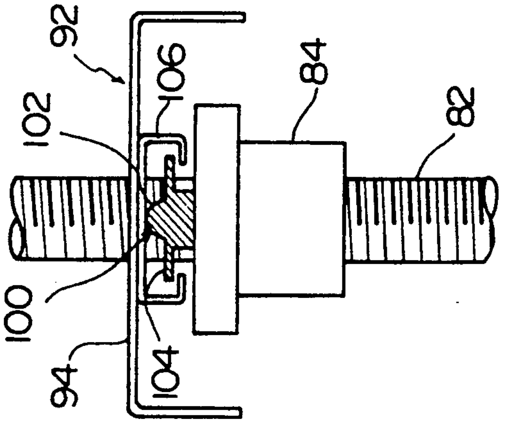
FIGS. 6 and 7 are sections showing a portion of the moving means in the multicolor developing device of FIG. 1.
Figure 6:
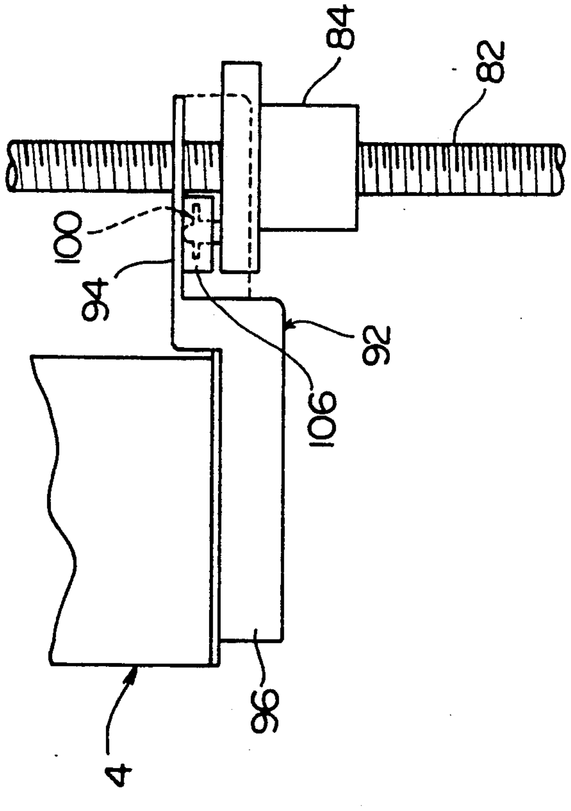

If further described with reference to FIGS. 1, 2, 6 and 7, the coupling bracket 92 has a supported portion 94 and two coupling portions 96 that forwardly extend from the supported portion 94. Each of the two coupling portions 96 has a horizontal plate portion that extends substantially horizontally and that are detachably coupled to the bottom plate 50 of the movable frame member 4 by a suitable coupling means (not shown) such as screws. The two coupling portions of the coupling bracket 92 are released from the bottom plate 50 of the movable frame member 4 when it is required to check or repair a plurality of developing mechanisms (which will be described later in detail) mounted on the movable frame member 4 or when it is required to check or repair a rotary drum (which will be described later in detail) on which is disposed an electrostatic photosensitive member that is to be developed and constitutional elements disposed in the periphery of the rotary drum. Then, as will be easily understood, the movable frame member 4 is simply moved upwards so as to be separated away from the stationary frame member 2 very quickly and easily. If further described with reference to FIGS. 1, 2, 6 and 7, the supported portion 94 of the coupling bracket 92 has a horizontal plate portion that extends substantially horizontally and that has a circular opening 98 in which is inserted the threaded shaft 82 of the screw means 80. As clearly diagramed in FIGS. 6 and 7, a supporting protuberance 100 that protrudes upwardly is secured onto the upper surface of the nut 84 of screw means 80 by a suitable method such as welding of the like. The supporting protuberance 100 has an upper end portion 102 of a semispherical shape, and an annular extended flange 104 is formed under the semispherical upper end portion 102. On the other hand, a, receiving piece 106 is secured to the lower surface of the horizontal plate portion of the supported portion 94 of the coupling bracket 92 by a suitable method such as welding or the like. The receiving piece 106 has a flat plate portion positioned on the support protuberance 100 and hanging portions that downwardly hang from both sides of the flat plate portion and then inwardly extend in the lateral direction to be positioned under the extended flange 104 of the support protuberance 100. As shown in FIGS. 6 and 7, the supported portion 94 of the coupling bracket 92 is placed, or more specifically, the receiving piece 106 secured to the lower surface of the supported portion 94 is placed on the semispherical upper end portion of support protuberance 100 of the nut 84, whereby the coupling bracket 92 and the weight of the movable frame member 4 coupled thereto are supported by the nut 84 of the screw means 80. The coupling bracket 92 is coupled to the nut 84 by placing the receiving piece 106 on the semispherical upper end portion of the support protuberance 100, and hence, is allowed to be tilted in any direction with respect to the nut 84. The direction in which the movable frame member 4 moves relative to the stationary frame member 2, i.e., the direction in which the rail means 30 extends in the stationary frame member 2 and the direction in which the threaded shaft 82 of the screw means 80 extends, are both set to be in the vertical direction. Due to molding error or assembling error, however, a slight difference may arise between the movable frame member and the stationary frame member in the direction of extension. In the diagramed embodiment, however, the coupling bracket 92, i.e., the movable frame member 4 is allowed to be tilted in any direction relative to the nut 84 of the screw means 80. Therefore, the above slight difference is compensated and no problem results from such a difference. If the coupling bracket 92 is not allowed to be tilted in any direction relative to the nut 84 of the screw means 80, even a slight difference between the direction in which the rail means 30 of the stationary frame member 2 extends and the direction in which the threaded shaft 82 of the screw means 80 extends, results in the occurrence of an excess stress that acts on the threaded shaft 82 or on the rail means 30 when the movable frame member 4 is moved, whereby a problem of breakage at an early time may be caused.

If further described with reference to FIGS. 1 and 2, a support bracket 108 is secured to the lower portion on the outer surface of one side plate 8 (side plate 8 of the right side as viewed from the back) of the stationary frame member 2. The support bracket 108 has a semi-box shape of which the upper portion and the outside portions in the lateral direction are open, and its upright rear wall 110 is secured to the outer surface of the side plate 8 of the stationary frame member 2 by a suitable securing means (not shown) such as screws. An electric motor 114 that constitutes a rotary drive source of the moving means 78 is mounted on the bottom wall 112 of the support bracket 108. Desirably, the electric motor 114 should be a stepping motor which is widely known per se and which is accurately controlled for its rotation by a pulse feed controller. The output shaft 116 of the electric motor 114 extends downwardly penetrating through the bottom wall 112 of the support bracket 108, and a toothed pulley 120 is fitted to the lower end of the output shaft 116. Another toothed pulley 122 is fitted to the lower end of the threaded shaft 82 of screw means 80. A toothed belt 124 is wound round the pulleys 120 and 122. An opening 126 is formed in the lower end portion of one side plate 8 of the stationary frame member 2, and the belt 124 extends passing through the opening 126. A support piece 128 is secured by screws 130 to the bottom plate 6 of the stationary frame member 2, and a tension roller 132 is rotatably mounted on the support piece 128. Position of the tension roller 132 relative to the belt 124 is adjusted by suitably adjusting the position of the support piece 128, and a suitable tension is imparted to the belt 124. The moving means 78 further includes a brake 134 which should desirably be an electromagnetic brake of the nonexcited operation type which produces no braking action when it is energized but which produces a bracking action when it is not energized. In the diagramed embodiment, the nonexcited operation-type electromagnetic brake 134 is disposed on the electric motor 114. The output shaft 116 of the electric motor 114 protrudes not only downwardly but also upwardly to enter into the housing of the frame 134, and the braking action of the brake 134 is applied to the upper end portion of the output shaft 116. An example of the nonexcited operation-type electromagnetic brake 134 may be the one which is produced by Shinko Denki Co. in the trade name of "BBS-4-3B".

Operation of the electric motor 114 in the moving means 78 is controlled by a control means (not shown) which can be constituted by a microprocessor. When the electric motor 114 constituted by the stepping motor is normally rotated, the normal rotation is transmitted to the threaded shaft 82 of the screw means 80 via the pulley 120, belt 124 and pulley 122, and the threaded shaft 82 is rotated in the clockwise direction as viewed from the upper direction. Then, the nut 84 ascends accompanying the rotation of the threaded shaft 82. The ascending motion of the nut 84 is transmitted to the movable frame member 4 via the coupling bracket 92, and thus, the movable frame member 4 ascends. When the electric motor 114 is reversely rotated, on the other hand, the reverse rotation is transmitted to the threaded shaft 82 via the pulley 120, belt 124 and pulley 122, and the threaded shaft 82 is rotated in the counter-clockwise direction as viewed from the upper direction. Then, the nut 84 descends, and the coupling bracket 92 and the movable frame member 4 descend due to their own weights accompanying the descending motion of the nut 84. When the electric motor 114 suddenly starts rotating or suddenly stops, the movable frame member 4 also suddenly starts moving or suddenly stops and considerable impact is given to the developing mechanisms (which will be described later) mounted on the movable frame member 4. In order to avoid such impact, it is desired that the speed of revolution is gradually increased at the time when the electric motor 114 starts rotating and the speed of revolution is gradually decreased when the revolution of the electric motor 114 is to be stopped. When the electric motor 114 is constituted by a stepping motor, the number of revolutions of the electric motor 114 changes depending upon the number of pulses that are fed per a unit time. At the time when the electric motor 114 starts rotating, therefore, the interval for feeding pulses is gradually shortened in order to gradually increase the number of revolutions of the electric motor 114 and when the revolution of the electric motor 114 is to be stopped, the interval for feeding pulses is gradually prolonged in order to gradually decrease the number of revolutions of the electric motor 114. According to one example of such a pulse feed control, the pulses are fed at a rate of 4500 pulses per second when the electric motor 114 is rotated at its full speed. At the start of rotation, however, the interval for feeding pulses is gradually shortened and 4500 pulses per second are fed after a lapse of 267 milliseconds. When the revolution is to be stopped, the interval for feeding pulses are gradually prolonged every pulse from the rate of 4500 pulses per second and the feed of pulse is stopped after a lapse of 267 milliseconds. By controlling the revolution of the electric motor 114 as described above, the movable frame member 4 is prevented from suddenly moving or suddenly stopping so that it can be accurately located at the required position.

In moving the movable frame member 4, attention should also be given to the following fact. That is, in the diagramed embodiment, an electric current is supplied to the nonexcited operation-type electromagnetic brake 134 simultaneously with the feeding of pulses to the electric motor 114, whereby the braking action of the brake 134 is released. And, the supply of an electric current to the nonexcited operation-type electromagnetic brake 134 is interrupted simultaneously with the stop of feed of pulses to the electric motor 114, and the brake 134 exhibits the braking action. Thus, the movable frame member 4 is reliably stopped and maintained at the required position. The nonexcited operation-type electromagnetic brake 134 also gives excellent advantage even in case of the accidental interruption of the electric current. When the electric current is cut off accidentally during movement of the movable frame member 4, the feeding of pulses to the electric motor 114 stops and, at the same time, the supply of electric current to the nonexcited operation-type electromagnetic brake 134 is also suspended, and consequently, the movable frame member 4 is stopped and is maintained at a position at which the electric current was cut off. Without the nonexcited operation-type electromagnetic brake 134 being provided, if the feeding of pulses to the electric motor 114 stops due to the occurrence of power failure, the movable frame member 4 is liable to suddenly fall down due to its own weight. In such a case, in order to prevent the movable frame member 4 from falling down, it is necessary to provide a relatively expensive mechanical brake for emergency use. If described with reference to FIGS. 1, 3 and 8, the movable frame member 4 is equipped with four developing mechanisms 136 that are disposed maintaining a distance in the direction in which the movable frame member 4 moves, i.e., in the vertical direction. Each of the four developing mechanisms 136 includes a developing housing 138 of which the front surface (surface of the right side in FIG. 8) is open. The developing housing 138 has a width which is a little smaller than the distance between the two side plates 48 of the moving frame member 4. A pair of guided pins 142 and 144 are secured to lower portions on the outer surface of both side walls 140 of the developing housing 138 maintaining a distance in the back-and-forth direction (right-and-left direction in FIG. 8). On the other hand, four guide means 146 are disposed on the inner surfaces of both side plates 48 of the movable frame member 4 maintaining a distance in the vertical direction to correspond to each of the developing mechanisms 136. Each of the guide means 146 is constituted by a member that defines a guide groove 148 which extends substantially horizontally in the back-and-forth direction, and is secured to the inner surface of the side plate 48 by a suitable securing means (not shown) such as screws. The guide groove 148 has a rear end which is open and a front end which is closed by a semicylindrical front wall 150. The pair of guided pins 142 and 144 provided at lower portions on the outer surfaces of both side walls 140 of the developing housing 138 are inserted into the guide groove 148 from the rear direction thereof; i.e., the developing housing 138 is mounted to move along the guide groove 148 substantially horizontally in the back-and-forth direction (as will become obvious from the description given later, the developing housing 138 moves in a direction in which it approaches, or separates away from, the rotary drum in the developing zone). The open rear end of the guide groove 148 is closed by a closing piece 152 secured thereto, and a resiliently urging means 153 which may be a compression coiled spring is interposed between the closing piece 152 and the guided pin 144 of the developing housing 138. The resiliently urging means 153 resiliently urges the developing housing 138 forward. The forward movement of the developing housing 138 is limited as the guided pin 142 comes into contact with the front wall 150 that is closing the front end of the guide groove 148. As will be easily understood with reference to FIGS. 8 and 1, a developing agent applying means 154 that extends substantially horizontally in the lateral direction is disposed in each of the developing housings 138. The developing agent applying means 154 can be constituted by a rotary cylindrical sleeve and a stationary permanent magnet disposed in the sleeve. The front portion of the developing agent applying means 154 is protruded forward through the open front surface of the developing housing 138. Distance-setting rollers 156 are rotatably fitted to both sides of the developing agent applying means 154, or more specifically, to the outside of both side walls 140 of the developing housing 138. The distance-setting rollers 156 are disposed in concentricity with the cylindrical sleeve of the developing agent applying means 154. The outer diameter of the distance-setting rollers 156 is set to be greater by a predetermined amount than the outer diameter of the cylindrical sleeve of the developing agent applying means 154.

Figure 8:
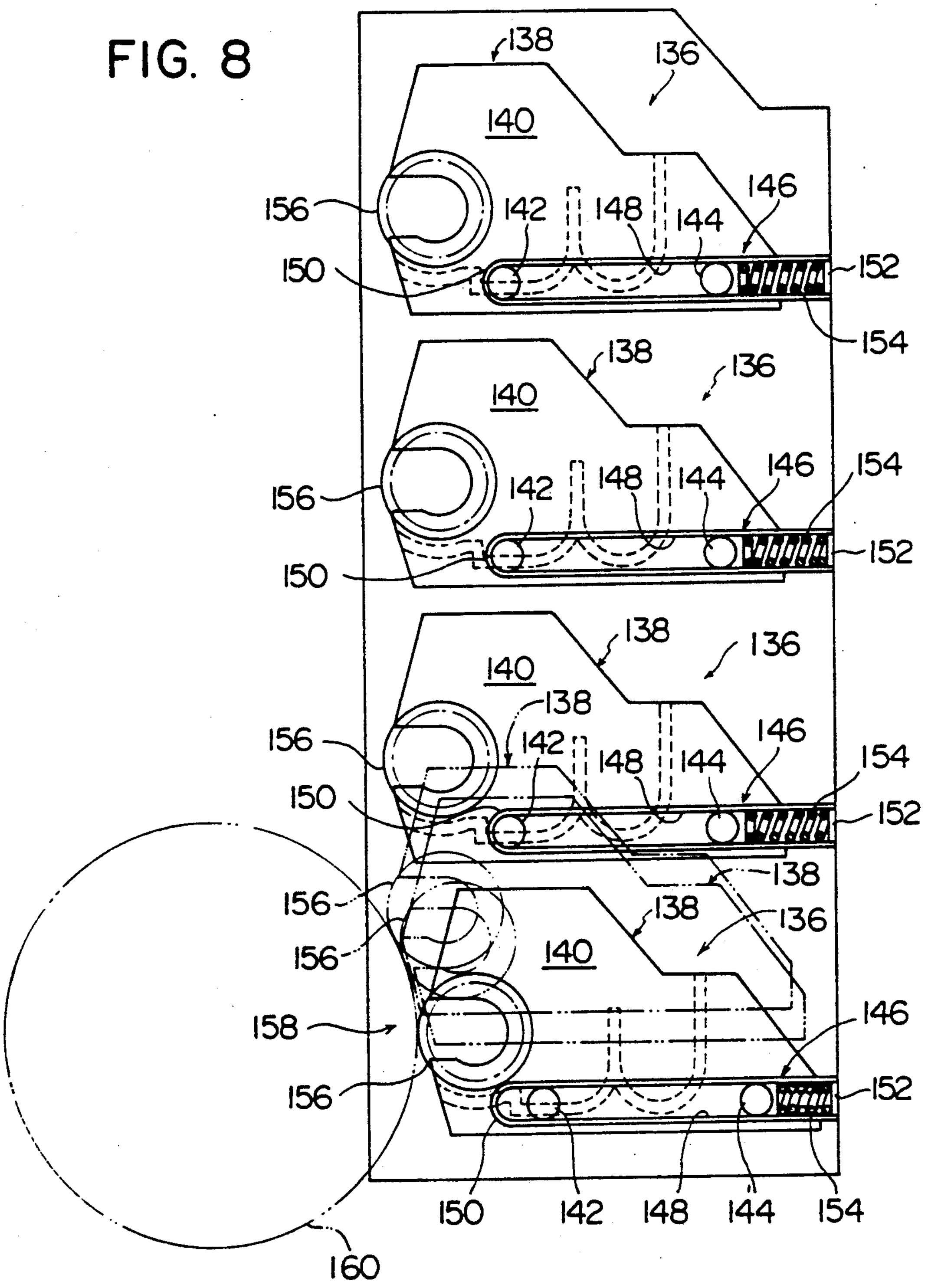
FIG. 8 is a sectional view showing a relationship between the movable frame member and developing mechanisms in the multicolor developing device of FIG. 1.

The movable frame member 4 is suitably moved in the vertical direction by the above moving means 78, and any one of the four developing mechanisms 136 mounted on the movable frame member 4 is positioned at the developing zone 158 (FIG. 8). In FIG. 8, the lowermost developing mechanism 136 is positioned at the developing zone 158. In the developing zone 158, the developing mechanism 136 is positioned to face the rotary drum 160. An electrostatic photosensitive material is disposed on the outer peripheral surface of the rotary drum 160 that rotates in the clockwise direction in FIG. 8, and an electrostatic latent image to be developed is formed on the electrostatic photosensitive material by a known electrophotographic method. When the movable frame member 4 is moved and a particular developing mechanism 136 is positioned at the developing zone 158, the distance-setting rollers 156 disposed on both sides of the developing mechanism 136 come in contact with the outer peripheral surface of the rotary drum 160 as indicated by a two-dot chain line in FIG. 8, whereby the developing housing 138 is forcibly moved backwards, i.e., moved in a direction to separate away from the rotary drum 160 against the resiliently urging action of the resiliently urging means 153. Thus, in the developing mechanism 136 that is positioned at the developing zone 158, the distance-setting rollers 156 come in contact with the outer peripheral surface of the rotary drum 160, and a distance between the developing agent applying means 154 and the rotary drum 160 is very accurately set to a predetermined value. Portions on both sides of the rotary drum 160 with which the distance-setting rollers 156 come in contact are portions not utilized for forming the electrostatic latent image, and no trouble is caused by the distance-setting rollers 156 that are in contact with such portions.

In the diagramed embodiment, in the developing housing 138 of each of the developing mechanisms 136, a pair of developing agent stirring means (not shown) constituted by rotatably mounted spiral vanes are disposed in addition to the developing agent applying means 154. When the developing mechanism 136 is positioned at the developing zone 158 to execute the developing action, it is essential that the pair of developing agent stirring means are suitably rotated together with the sleeve of the developing agent applying means 154. If described referring chiefly to FIGS. 9 and 10, a rotary drive source 162 which may be a usual electric motor is mounted on the outer surface of one side plate 8 (side plate 8 of the right side as viewed from the back) of the stationary frame member 2 (reference should also be made to FIGS. 1, 2, 4 and 5). The output shaft 164 that extends substantially horizontally, of the drive source 162 penetrates through the side plate 8 to further extend inwardly, and an output gear 166 is secured to the end portion of the output shaft 164. A support pin 168 that inwardly protrudes substantially horizontally is mounted on one side plate 8 of the stationary frame member 2, and an interlocking gear 170 is rotatably fitted to the support pin 168. The gear 170 engages with the output gear 166. A movable member 172 is pivotably fitted to the support pin 168, and an interlocking gear 174 is rotatably fitted to the movable member 172. The gear 174 engages with the gear 170. As shown in FIG. 10, an electromagnetic solenoid 178 is mounted on the inner surface of the side plate 8 of the stationary frame member 2, and the output rod 180 of the electromagnetic solenoid 178 is pivotably coupled to the movable member 172. When the electromagnetic solenoid 178 is not energized, the movable member 172 is located at a non-coupling position indicated by a two-dot chain line in FIG. 10 and when the electromagnetic solenoid 178 is energized, the movable member 172 is moved to a coupling position indicated by a solid line in FIGS. 9 and 10. Onto one side plate 48 (side plate 48 of the right side as viewed from the back) of the movable frame member 4 are secured four support members 182 to correspond to the four developing mechanisms 136 (reference should also be made to FIGS. 3 and 4). To the support members 182 are rotatably fitted short shafts 184 to which are secured interlocking gears 186. As will be easily comprehended with reference to FIGS. 9 and 10, when a predetermined developing mechanism 136 is located at the developing zone 158, the support member 182 related to the developing mechanism 136 is positioned to be opposed to the movable member 172 that is mounted on the stationary frame member 2. The short shaft 184 extends inwardly penetrating through the side wall 48 of the movable frame member 4, and an interlocking gear 188 is secured to the inner end portion of the short shaft 184. If the description is continued with reference to FIG. 9, one end of the rotary shaft 190 to which is secured the sleeve of the developing agent applying means 154 in the developing mechanisms 136, protrudes penetrating through one side wall 140 (side wall 140 of the right side as viewed from the back) of the developing housing 138. The distance-setting roller 156 mentioned earlier is rotatably fitted to the protruded end of the rotary shaft 190, and an input gear 192 and an interlocking gear 193 are further secured thereto. The input gear 192 engages with the gear 188. The ends of rotary shafts 194 and 196 of the pair of developing agent stirring means (not shown) disposed in the developing housing 138, protrude penetrating through one side wall 140 of the developing housing 138. An input gear 198 and an interlocking gear 200 are secured to the protruded end of the rotary shaft 194. An input gear 202 is secured to the protruded end of the rotary shaft 196 and is in mesh with the gear 200. Furthermore, horizontally protruding short shafts 204 and 206 are secured to one side wall 140 of the developing housing 138, and an interlocking gear 208 is rotatably fitted to the short shaft 204 and an interlocking gear 210 is rotatably fitted to the short shaft 206. The gear 208 is in mesh with the gear 193. The gear 210 engages with the gear 208 and, further, engages with the input gear 198.

Figure 9:
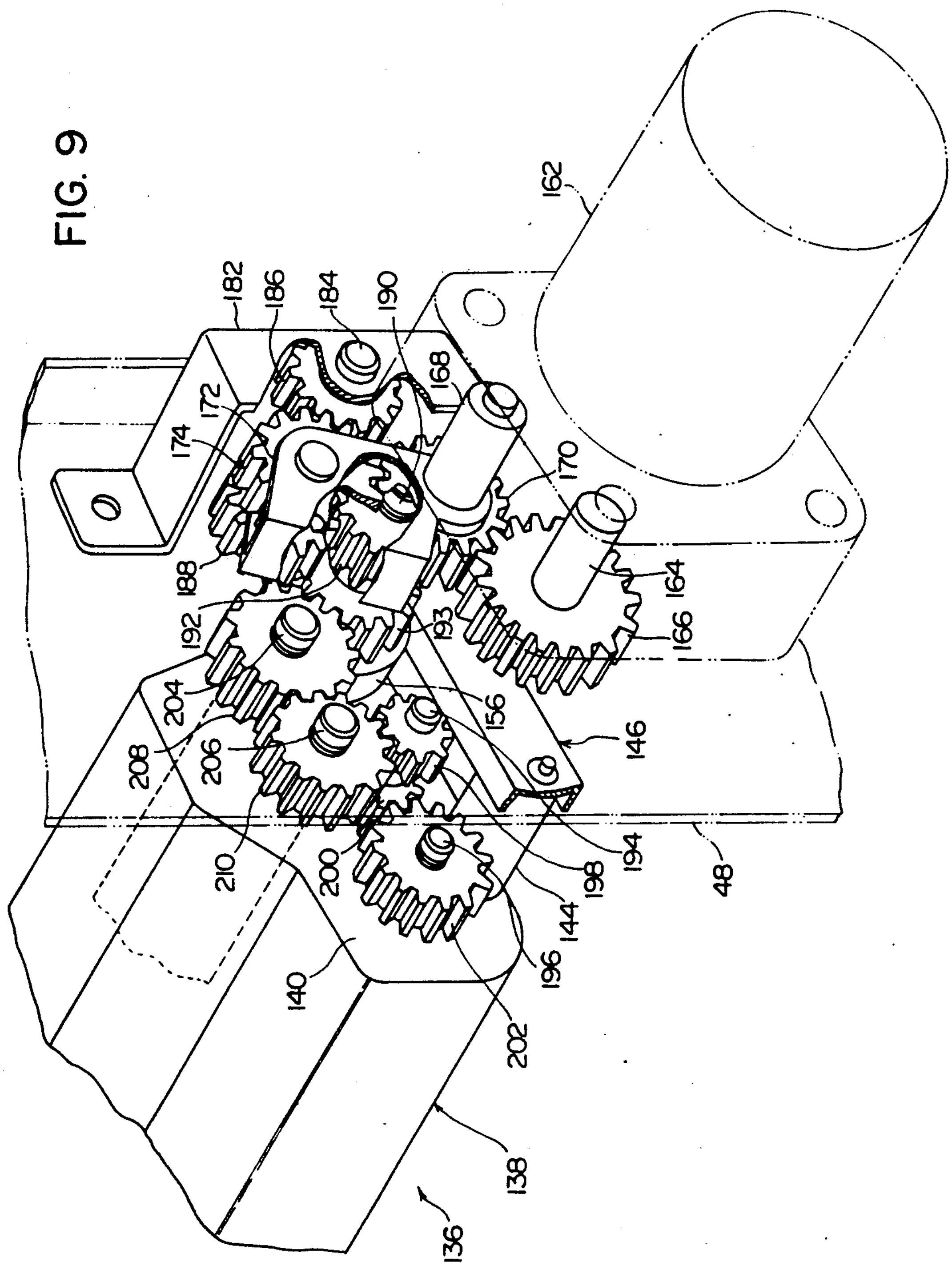
FIGS. 9 and 10 are a partial perspective view and a partial schematic view illustrating the arrangement related to driving the developing mechanisms in the multicolor developing device of FIG. 1.
Figure 10:
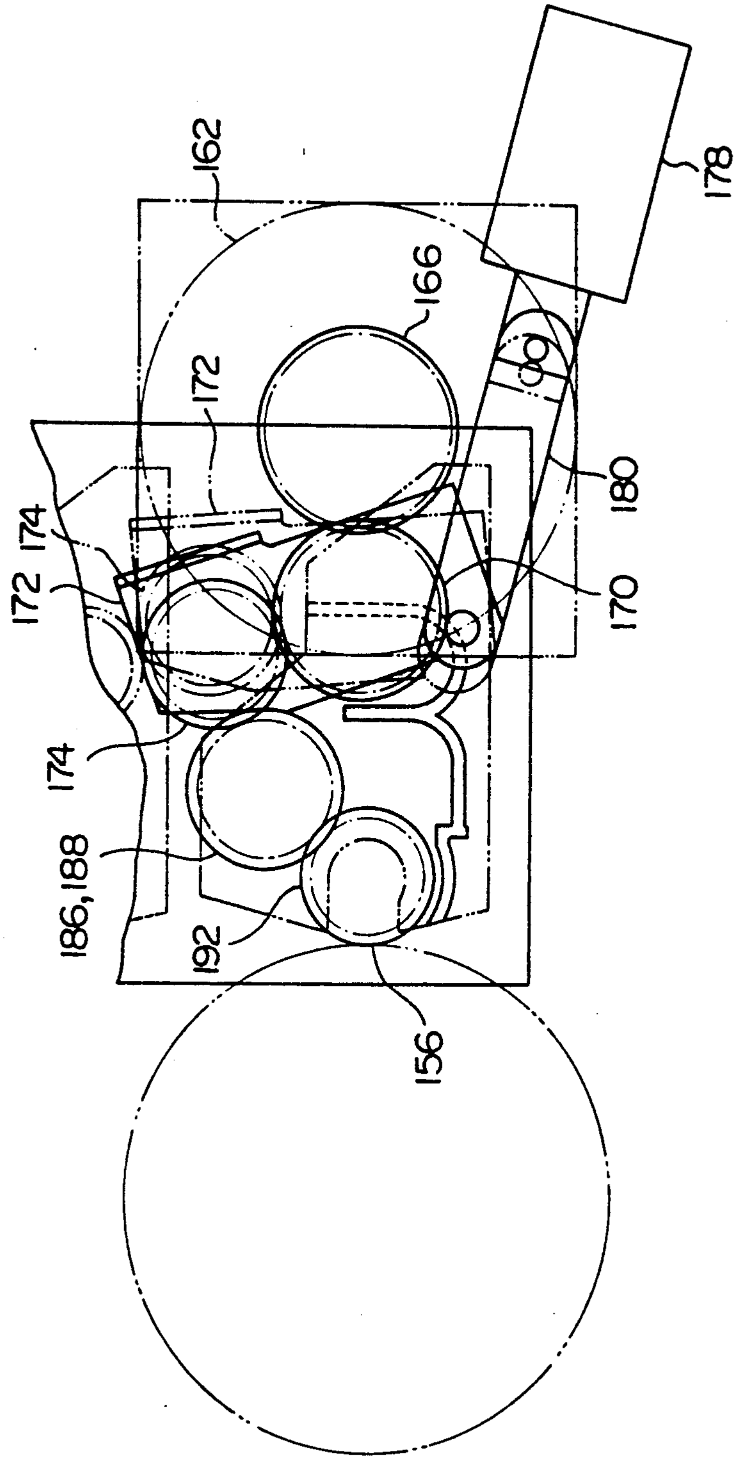

As the movable frame member 4 stops to move and a predetermined developing mechanism 136 is positioned at the developing zone 158, the electromagnetic solenoid 178 is energized to move the movable member 172 to the coupling position indicated by the solid line in FIGS. 9 and 10. Then, the gear 174 fitted to the movable member 172 comes into engagement with the gear 186 of the predetermined developing mechanism 136. Thereafter, the rotary drive source 162 is energized to rotate the output shaft 164 thereof and the output gear 166 secured thereto. The rotation is transmitted to the input gear 192 of the developing agent applying means 154 via gears 170, 174, 186 and 188, and the sleeve of the developing agent applying means 154 is rotated. The rotation of the input gear 192 is transmitted to the input gear 198 of the developing agent stirring means via gears 193, 208 and 210, and is further transmitted to the input gear 202 of the developing agent stirring means via gear 200, whereby the pair of developing agent stirring means are rotated as desired. When the developing by the predetermined developing mechanism 136 is terminated, the rotary drive source 162 is deenergized and the electromagnetic solenoid 178 is deenergized, too. Then, the movable member 172 returns back to the non-coupling position indicated by the two-dot chain line in FIG. 10, and the gear 174 fitted to the movable member 172 is separated away from the gear 186 of the predetermined developing mechanism 136. When this condition is resumed, it is allowed to freely move the movable frame member 4 without being interrupted by the gear train.

In the foregoing was described in detail a concrete embodiment of the multicolor developing device constituted according to the present invention with reference to the accompanying drawings. However, it needs not be much mentioned that the present invention is in no way limited to the above embodiment only but can be modified or altered in a variety of ways without departing from the scope of the invention.

What we claim is:

1. A multicolor developing device comprising:

a stationary frame member, a movable frame member mounted on said stationary frame member to reciprocally move in a predetermined direction, a plurality of developing mechanisms mounted on said movable frame member and maintaining a distance in said predetermined direction, and a moving means for reciprocally moving said movable frame member in said predetermined direction, each of said plurality of developing mechanisms being selectively positioned at a developing zone by movement of said movable frame member caused by said moving means and each of said plurality of developing mechanisms executing developing action with a different color at said developing zone, said moving means including a screw means that has a threaded shaft extending in said predetermined direction and a nut engaged with said threaded shaft, and a rotary drive source comprising a stepping motor that rotates said threaded shaft of said screw means, one of said stationary frame member and said movable frame member having disposed thereon, a pair of rail means that extend in said predetermined direction and maintain a distance in the lateral direction, each of said rail means having a pair of rail members that extend in said predetermined direction and that are disposed in opposition to each other to maintain a predetermined distance therebetween, and the other of said stationary frame member and said movable frame member having two pairs of rollers disposed thereon to maintain a distance in said predetermined direction, said roller pairs being rotatably disposed and maintaining a distance in said lateral direction, said roller pairs having an outer diameter that meets said predetermined distance between said rail members of said rail means, and being placed between said rail members.

2. The multicolor developing device according to claim 1, wherein said threaded shaft of said screw means is rotatably fitted to said stationary frame member, and said nut of said screw means is coupled to said movable frame member.

3. The multicolor developing device according to claim 1, wherein said screw means of said moving means is a ball thread means having a plurality of balls arranged between said threaded shaft and said nut.

4. The multicolor developing device according to claim 1, wherein said screw means and said stepping motor are drivably coupled together via a timing belt.

5. The multicolor developing device according to claim 1, wherein said predetermined direction is the vertical direction.

6. The multicolor developing device according to claim 1, wherein said moving means includes a nonexcited operation-type electromagnetic brake which produces braking action when it is not energized and which does not produce braking action when it is energized.

7. The multicolor developing device according to claim 1, wherein said moving means includes a control means that controls pulses fed to said rotary drive source that comprises a stepping motor, and when said movable frame member is being moved by a required distance by rotating said threaded shaft by the action of said rotary drive source, said control means gradually shortens an interval for feeding pulses to said rotary drive source in order to gradually increase the revolution speed of said rotary drive source when said movable frame member starts moving and said control means gradually prolongs the interval for feeding pulses to said rotary drive source in order to gradually decrease the revolution speed of said rotary drive source when the motion of the movable frame member is to be stopped.

8. The multicolor developing device according to claim 1, wherein when each of said developing mechanisms is positioned at said developing zone, it is opposed to a rotary drum on which surface there is disposed electrostatic photosensitive material to develop an electrostatic latent image formed on said electrostatic photosensitive material, and each of said developing mechanisms includes a developing housing mounted on said movable frame member to move over a predetermined range in a direction to approach, and separate away from, the rotary drum, a resiliently urging means which resiliently urges said developing housing in a direction to approach said rotary drum, a developing agent applying means that is mounted on said developing housing to hold a developing agent on the surface thereof, and a pair of distance-setting rollers, that are rotatably disposed on both sides of said developing agent applying means, and when each of said developing mechanisms is positioned at the developing zone, said pair of distance-setting rollers are brought into contact with the surface of the rotary drum such that said developing housing is moved in a direction to separate away from said rotary drum against a resiliently urging action of said resiliently urging means, enabling each of the developing mechanisms to be positioned at the predetermined position relative to the surface of said rotary drum.

9. The multicolor developing device according to claim 8, wherein said developing agent applying means in each of said developing mechanisms has a cylindrical sleeve that holds the developing agent on the surface thereof, and said pair of distance-setting rollers are mounted in concentricity with said sleeve.

10. The multicolor developing device according to claim 1, wherein a coupling bracket is detachably mounted on said movable frame member, said threaded shaft of said screw means is rotatably fitted to said stationary frame member, said nut of said screw means is coupled to said coupling bracket, and when said coupling bracket is removed from said movable frame member and then, the movable frame member is moved in said predetermined direction, said movable frame member can be separated away from said stationary frame member.

11. The multicolor developing device according to claim 10, wherein said predetermined direction is the vertical direction, said threaded shaft extends in the vertical direction, and said movable frame member is upwardly moved in the vertical direction so as to be separated away from said stationary frame member.

12. The multicolor developing device according to claim 11, wherein said movable frame member has a bottom plate, and said coupling bracket is detachably attached to the lower surface of said bottom plate.

13. The multicolor developing device according to claim 1, wherein a pair of racks extending in a predetermined direction are disposed on one of said stationary frame member and said movable frame member and maintain a distance in the lateral direction, wherein a rotary shaft extending in said lateral direction is rotatably mounted on the other of said stationary frame member or said movable frame member, wherein a pair of pinions are fitted to said rotary shaft maintaining a distance in the lateral direction, at least one of said pair of pinions is rotatably fitted to said rotary shaft and is releasably fastened to said rotary shaft by a fastening means to inhibit the rotation thereof, and wherein said pair of pinions ar engaged with said pair of racks.

14. The multicolor developing device according to claim 13, wherein a pair of engaging members are disposed on one of said stationary frame member and said movable frame member and maintain a distance in the lateral direction to move between an engaging position and a non-engaging position, and wherein engaged portions are disposed on the other of said stationary frame member and said movable frame member and maintain a distance in the lateral direction, and when said pair of engaging members are located at said engaging positions and, said movable frame member is moved in said predetermined direction, said engaged portions are brought into contact with said engaging portions and said movable frame member is positioned as desired relative to said stationary frame member, and when said engaging members are located at said non-engaging positions, said engaging members no longer interfere with said engage portions.

15. The multicolor developing device according to claim 14, wherein a positioning shaft that extends in the lateral direction is disposed on the other of said stationary frame member and said movable frame member, sand said engaging portions are defined by both end portions of said positioning shaft.

16. The multicolor developing device according to claim 13, wherein said predetermined direction is the vertical direction, and said engaged portions come in contact with the upper surfaces of said engaging members when said engaging members are located at said engaging positions and said movable frame member is lowered.

17. The multicolor developing device according to claim 1, wherein said threaded shaft of said screw means is rotatably fitted to one of said stationary frame member or said movable frame member, wherein said nut of said screw means is coupled to the other of said stationary frame member or said movable frame member via a coupling bracket, and wherein said coupling bracket and said nut are coupled together so as to tilt in any direction relative to each other.

18. The multicolor developing device according to claim 17, wherein said predetermined direction is the vertical direction, said threaded shaft of said screw means extends in the vertical direction and is fitted to said stationary frame member, said bracket is mounted on said movable frame member, said nut is provided with an upwardly facing semispherical support protuberance, and said coupling bracket is placed on said support protuberance.

19. A multicolor developing device comprising:

a stationary frame member, a movable frame member mounted on said stationary frame member to reciprocally move in a predetermined direction, a plurality of developing mechanisms mounted on said movable frame member and maintaining a distance in said predetermined direction, and a moving means for reciprocally moving said movable frame member in said predetermined direction, each of said plurality of developing mechanisms being selectively positioned at a developing zone by movement of said movable frame member caused by said moving means and being in opposition at said developing zone with a rotary drum on which surface is disposed an electrostatic photosensitive material to develop an electrostatic latent image formed on said electrostatic photosensitive material in a different color, each of said developing mechanisms including a developing housing mounted on said movable frame member to move over a predetermined range in a direction to approach, and separate away from, the rotary drum, a resiliently urging means which resiliently urges said developing housing in a direction to approach said rotary drum, a developing agent applying means that is mounted on said developing housing to hold a developing agent on the surface thereof, and a pair of distance-setting rollers that are rotatably disposed on both sides of said developing agent applying means, and when each of said developing mechanisms is positioned at the developing zone, said pair of distance-setting rollers are brought into contact with the surface of said rotary drum such that said developing housing is moved in a direction to separate away from said rotary drum against a resilient urging action of said resiliently urging means, thereby enabling each of the developing mechanisms to be positioned at the predetermined position relative to the surface of said rotary drum.

20. The multicolor developing device according to claim 19, wherein said developing agent applying means in each of said developing mechanisms has a cylindrical sleeve that holds the developing agent on the surface thereof, and said pair of distance-setting rollers are mounted in concentricity with said sleeve.

21. A multicolor developing device comprising:

a stationary frame member, a movable frame member mounted on said stationary frame member to reciprocally move in a predetermined direction, a plurality of developing mechanisms mounted on said movable frame member and maintaining a distance in said predetermined direction, and a moving means for reciprocally moving said movable frame member in said predetermined direction, each of said plurality of developing mechanisms being selectively positioned at a developing zone by movement of said movable frame member caused by said moving means and executing developing with a different color at said developing zone, a coupling bracket being detachably mounted on said movable frame member, said moving means including a screw means having a threaded shaft rotatably fitted to said stationary frame member and a nut that is coupled to said coupling bracket and is engaged with said threaded shaft, and when said coupling bracket is removed from said movable frame member and then said movable frame member is moved in said predetermined direction, said movable frame member can be separated from said stationary frame member.

22. The multicolor developing device according to claim 21, wherein said predetermined direction is the vertical direction, said threaded shaft extends in the vertical direction, sand said movable frame member is upwardly moved in the vertical direction so as to be separated away from said stationary frame member.

23. The multicolor developing device according to claim 22, wherein said movable frame member has a bottom plate, and said coupling bracket is detachably attached to the lower surface of said bottom plate.

24. The multicolor developing device according to claim 23, wherein a pair of racks extending in the vertical direction are disposed on said stationary frame member and maintain a distance in the lateral direction, wherein a rotary shaft extending in said lateral direction is rotatably mounted on said movable frame member, wherein a pair of pinions are fitted to said rotary shaft and maintain a distance in the lateral direction, and wherein at least one of said pair of pinions is rotatably fitted to said rotary shaft and is releasably fastened to said rotary shaft by a fastening means to inhibit the rotation thereof, and said pair of pinions are engaged with said pair of racks.

25. The multicolor developing device according to claim 24, wherein a pair of engaging members are disposed on said stationary frame member and maintain a distance in the lateral direction to move between an engaging position and a non-engaging position, wherein engaged portions are disposed on said movable frame member and maintain a distance in said lateral direction, and wherein when said pair of engaging members are located at said engaged positions and said movable frame member is lowered, said engaged portions are brought into contact with the upper surfaces of said engaging portions and said movable frame member is positioned as desired relative to said stationary frame member, and when said engaging portions are located at said non-engaging position, said engaging members no longer interfere with said engaged portions.

26. The multicolor developing device according to claim 25, wherein a shaft that extends in said lateral direction is disposed on said movable frame member, and said engaged portions are defined by both end portions of said shaft.

27. The multicolor developing device according to claim 26, wherein a pair of rail means that extend in the vertical direction are disposed on said stationary frame member and maintain a distance in the lateral direction, each of said rail means has a pair of rail members that extend in the vertical direction in opposition to each other and maintain a predetermined distance, and wherein a pair of rollers are fitted to said rotary shaft disposed on said movable frame member and another pair of rollers are fitted to said shaft that defines said engaged portions, said rollers being rotatably fitted and maintaining a distance in the lateral direction, and having an outer diameter that meets said predetermined distance, and being placed between said rail members of said rail means.

28. The multicolor developing device according to claim 22, wherein said coupling bracket and said nut are coupled together so as to tilt in any direction relative to each other.

29. The multicolor developing device according to claim 28, wherein said nut is provided with an upwardly facing semispherical support protuberance, and said coupling bracket is placed on said support protuberance.

30. A multicolor developing device comprising:

a stationary frame member, a movable frame member mounted on said stationary frame member to reciprocally move in a predetermined direction, a plurality of developing mechanisms mounted on said movable frame member and maintaining a distance in said predetermined direction, a moving means for reciprocally moving said movable frame member in said predetermined direction, each of said plurality of developing mechanisms being selectively positioned at a developing zone by the movement of said movable frame member caused by said moving means and executing developing with a different color at said developing zone, a pair of racks which extend in said predetermined direction and are disposed on one of said stationary frame member or said movable frame member and maintain a distance in the lateral direction, a rotary shaft which extends in said lateral direction and is rotatably mounted on the other of said stationary frame member and said movable frame member, and a pair of pinions which are fitted to said rotary shaft and maintain a distance in said lateral direction, said pair of pinions being engaged with said pair of racks.

31. The multicolor developing device according to claim 30, wherein said moving means includes a screw means that has a threaded shaft extending in said predetermined direction and a nut engaged with said threaded shaft, and at least one of said pair of pinions is rotatably fitted to said rotary shaft and is releasably fastened thereto by a fastening means.

32. The multicolor developing device according to claim 31, wherein a pair of rail means that extend in said predetermined direction and maintain a distance in the lateral direction are disposed on one of said stationary frame member and said movable frame member, wherein each of said rail means has a pair of rail members that extend in said predetermined direction in opposition to each other and maintain a predetermined distance, and wherein two pairs of rollers are disposed and maintain a distance in said predetermined direction on the other of said stationary frame member or said movable frame member, said roller pairs being rotatably fitted to maintain a distance in said lateral direction, having an outer diameter that meets said distance, and being placed between said rail members of said rail means.

33. The multicolor developing device according to claim 31, wherein said threaded shaft of said screw means is rotatably fitted to one of said stationary frame member and said movable frame member, wherein said nut of said screw means is coupled to the other of said stationary frame member or said movable frame member via a coupling bracket, and wherein said coupling bracket and said nut are coupled together so as to tilt in any direction relative to each other.

34. The multicolor developing device according to claim 33, wherein said predetermined direction is the vertical direction, said threaded shaft of said screw means extends in the vertical direction and is fitted to said stationary frame member, said bracket is mounted on the lower surface of the bottom plate of said movable frame member, said nut is provided with an upwardly facing semispherical support protuberance, and said coupling bracket is placed on said support protuberance.

35. A multicolor developing device comprising:

a stationary frame member, a movable frame member mounted on said stationary frame member to reciprocally move in a predetermined direction, a plurality of developing mechanisms mounted on said movable frame member and maintaining a distance in said predetermined direction, and a moving means for reciprocally moving said movable frame member in said predetermined direction, each of said plurality of developing mechanisms being selectively positioned at a developing zone by movement of said movable member caused by said moving means and executing developing with a different color at said developing zone, said moving means including a screw means that has a threaded shaft extending in said predetermined direction and a nut engaged with said threaded shaft, said threaded shaft of said screw means being rotatably fitted to one of said stationary frame member and said movable frame member, said nut of said screw means being coupled to the other of said stationary frame member or said movable frame member via a coupling bracket, and said coupling bracket and said nut being coupled together so as to tilt in any direction relative to each other.

36. The multicolor developing device according to claim 35 wherein said predetermined direction is the vertical direction, said threaded shaft of said screw means extends in the vertical direction and is fitted to said stationary frame member, said coupling bracket is mounted on said movable frame member, said nut is provided with an upwardly facing semispherical support protuberance, and said coupling bracket is placed on said support protuberance.

37. The multicolor developing device according to claim 35 wherein a pair of racks extending in said predetermined direction are disposed on one of said stationary frame member or said movable frame member, a rotary shaft extending in said lateral direction is rotatably mounted on the other of said stationary frame member or said movable frame member, a pair of pinions are fitted to said rotary shaft and maintain a distance in said lateral direction, at least one of said pair of pinions is rotatably fitted to said rotary shaft and is releasably fastened to said rotary shaft by a fastening means, and said pair of pinions are engaged with said pair of racks.

38. The multicolor developing device according to claim 35, wherein a pair of rail means that extend in said predetermined direction and maintain a distance in the lateral direction are disposed on one of said stationary frame member and said movable frame member, each of said rail means has a pair of rail members that extend in said predetermined direction in opposition to each other and maintain a predetermined distance, and two pairs of rollers are disposed to maintain a predetermined distance in said predetermined direction on the other of said stationary frame member and said movable frame member, said roller pairs being rotatably fitted and maintaining a distance in said lateral direction, having an outer diameter that meets said distance, and being placed between said rails members of said rail means.

* * * * *